United States Patent
Hotokeishi

(10) Patent No.: US 8,215,555 B2
(45) Date of Patent: Jul. 10, 2012

(54) BARCODE DATA MANAGEMENT DEVICE, PRINTING APPARATUS

(75) Inventor: Kenichirou Hotokeishi, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 349 days.

(21) Appl. No.: 12/543,863

(22) Filed: Aug. 19, 2009

(65) Prior Publication Data

US 2010/0243725 A1    Sep. 30, 2010

(30) Foreign Application Priority Data

Mar. 25, 2009  (JP) .................................. 2009-073680

(51) Int. Cl.
*G06K 7/10* (2006.01)
(52) U.S. Cl. .............................. 235/462.01; 235/462.25
(58) Field of Classification Search .................. 235/375, 235/470, 462.01–462.25
See application file for complete search history.

(56) References Cited

U.S. PATENT DOCUMENTS

| 7,121,469 | B2 * | 10/2006 | Dorai et al. .................... 235/470 |
| 2002/0067502 | A1 | 6/2002 | Hansen |
| 2004/0099741 | A1 * | 5/2004 | Dorai et al. .............. 235/462.08 |
| 2007/0223025 | A1 | 9/2007 | Hashizume |
| 2010/0243725 | A1 * | 9/2010 | Hotokeishi .................... 235/375 |

FOREIGN PATENT DOCUMENTS

JP    2002-236569 A    8/2002
JP    2007-253598 A    10/2007

* cited by examiner

*Primary Examiner* — Thien M Le
(74) *Attorney, Agent, or Firm* — Sughrue Mion, PLLC

(57) ABSTRACT

There is provided a barcode data management device including: a conversion unit that converts print data including barcode data into electronic format data for viewing; an extraction unit that extracts barcode data included in the print data, the barcode data including a start position, a range, a type and actual encoded data from the barcode image rendered into a viewable state; and an attachment unit that attaches the barcode data extracted by the extraction unit to a non-viewing region provided in the electronic format data.

5 Claims, 7 Drawing Sheets

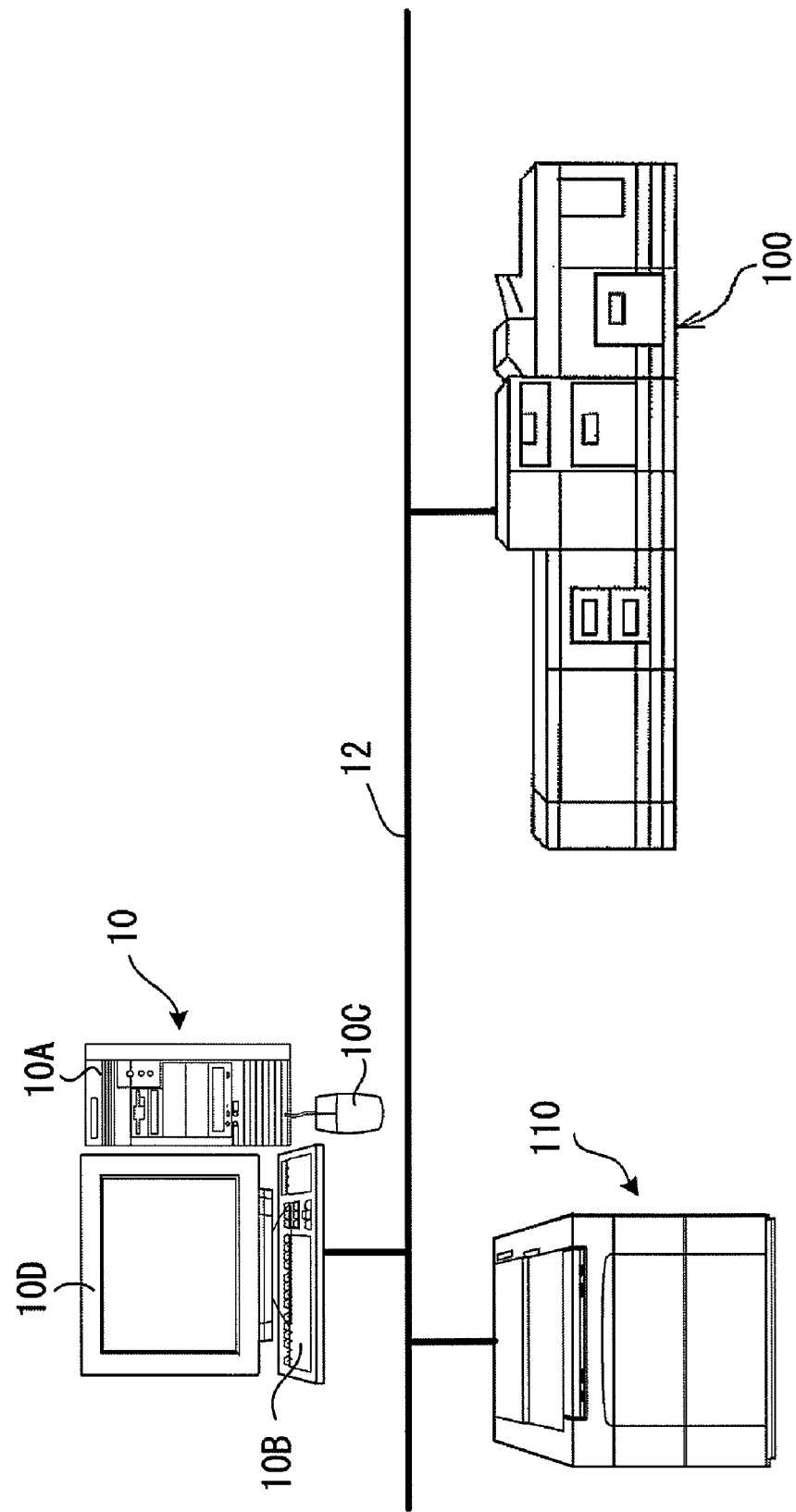

BARCODE DATA MANAGEMENT DEVICE, PRINTING APPARATUS

CROSS-REFERENCE TO RELATED APPLICATION

This application claims priority under 35 USC 119 from Japanese Patent Application No. 2009-073680 filed on Mar. 25, 2009.

BACKGROUND

1. Technical Field

The present invention relates to a barcode data management device and a printing apparatus.

2. Related Art

In printing systems for enterprise operations and the like, print data of material for printing in the printing system is described by a print language of a page description language or the like. The printing system interprets this page description language format and generates bit map format data, then performs printing based on this bit map format data.

SUMMARY

The present invention is a barcode data management device that, when converting print data including a barcode image into an electronic format and printing based on the converted electronic format, can perform printing of a more accurate barcode image in comparison to printing based on the barcode image converted into the electronic format.

A first aspect of the present invention provides a barcode data management device including:

a conversion unit that converts print data including barcode data into electronic format data for viewing;

an extraction unit that extracts barcode data included in the print data, the barcode data including a start position, a range, a type and actual encoded data from the barcode image rendered into a viewable state; and an attachment unit that attaches the barcode data extracted by the extraction unit to a non-viewing region provided in the electronic format data.

BRIEF DESCRIPTION OF THE DRAWINGS

Exemplary embodiments of the present invention will be described in detail based on the following figures, wherein:

FIG. 1 is a schematic configuration diagram of an enterprise printing system according to the present exemplary embodiment;

DETAILED DESCRIPTION

Electronic formats in the present invention are data formats interpretable by a display unit for displaying on a display screen. Examples of electronic document formats include, for example, PDF documents (Portable Document Format), Word documents (Microsoft Office Word), Excel documents (Microsoft Office Excel), and these are formats that can each be interpreted by their respective dedicated applications.

FIG. 1 is a schematic configuration diagram showing an enterprise printing system according to an exemplary embodiment of the present invention. It should be noted that "enterprise system" refers to activities that occurs within an organization. For example, administration of all the central corporate activities, such as sales management, production management, HR, payroll etc. A related systems that prints forms with runs of several thousand to several tens of thousands of sheets is referred to as a "enterprise printing system".

The main body of an enterprise printing system is an enterprise printing apparatus 100, and print data is input to this enterprise printing apparatus 100.

The enterprise printing apparatus 100 is, for example, sometimes called on to print on recording paper 50 (see FIG. 3) that has been preprinted. Printing of print data is performed so that the data is filled into the spaces at appropriate locations of a form (table etc.).

Figure 2B:
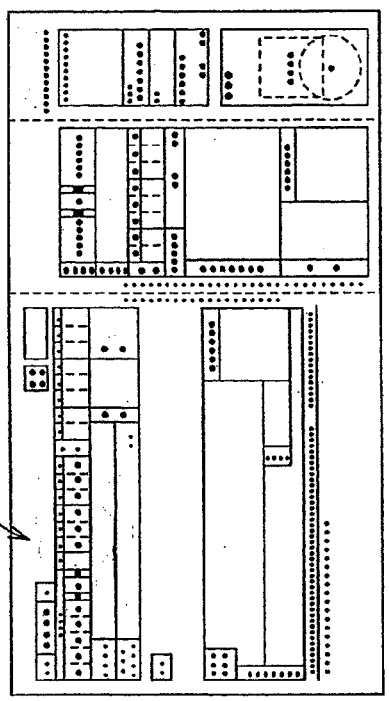
FIG. 2A to 2D are plan views when a form is divided into separate categories of data.
Figure 2D:
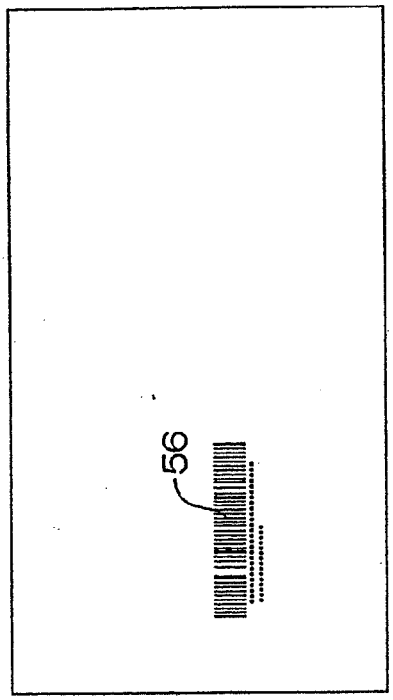
Figure 2A:
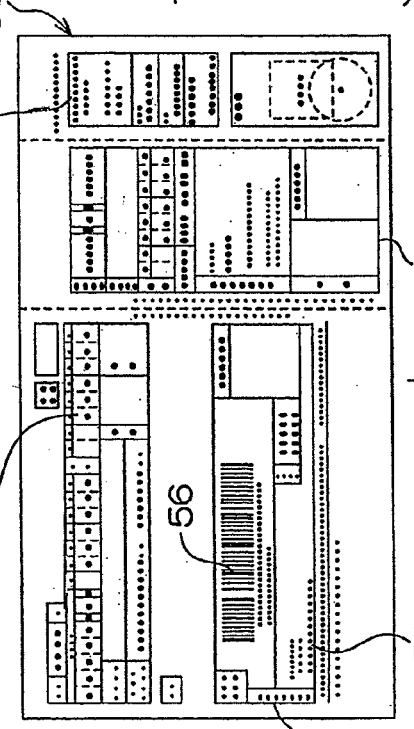

FIG. 2A shows an example of a form blank 50A that has been pre-printed with a form. The form blank 50A shown in FIG. 2 is a "payment transaction form" accepted in convenience stores etc., for example, with columns for filling in with the amount of payment, payee name, electronic money transfer financial institution, etc., formed by ruled lines 52 and text 54.

There is sometimes a barcode image 56 already present on such a form blank 50A (print data).

Alternatively, barcode image data may be incorporated in the print data, to be printed as the barcode image 56 during printing. The barcode image 56 is printed in a specific region at a specific location of the form blank 50A. The actual encoded data of the barcode image 56 can be obtained by reading the barcode image 56 with a reading device (barcode reader etc.).

Schematic Configuration of the Enterprise Printing Apparatus 100

Figure 3:
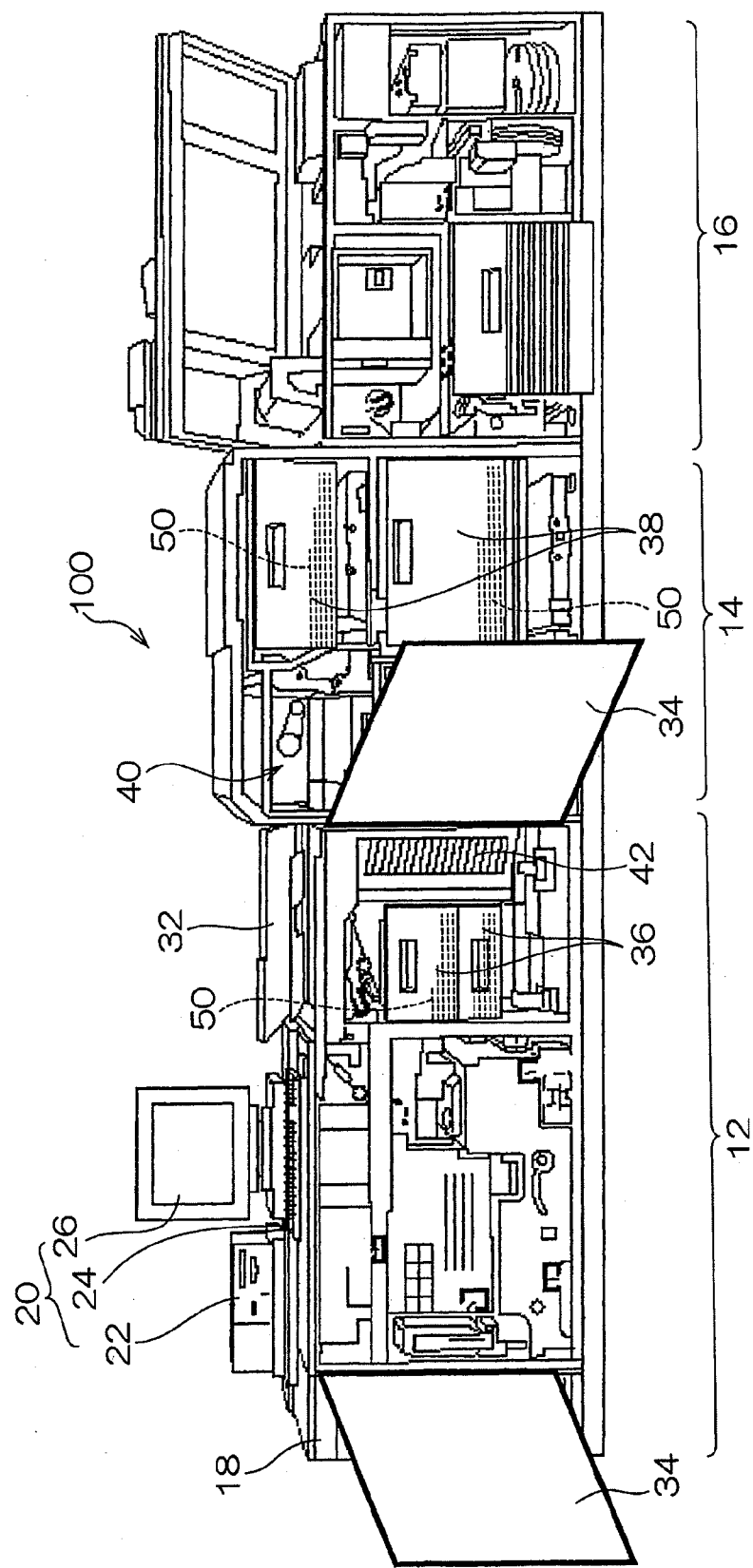
FIG. 3 is a schematic configuration diagram of an enterprise printing apparatus according to the present exemplary embodiment.

FIG. 3 shows the enterprise printing apparatus 100 according to the present exemplary embodiment. The enterprise printing apparatus 100 is broadly divided into an image forming unit 12, a paper storage unit 14, and a post-processing unit 16, in sequence from the left hand side of FIG. 3.

The image forming unit 12 is provided with a main control unit 20 on the top face of a casing 18 of the image forming unit 12, the main control unit 20 controlling the enterprise printing apparatus 100 overall. The main control unit 20 is equipped with a control main body 22, a keyboard 24, and a display 26.

A rectangular shaped opening portion is also provided at the right hand side of the main control unit 20 in FIG. 3 (on the top face of the image forming unit 12). An openable lid 32 is attached to this opening.

The image forming unit 12 is covered by the casing 18 and is equipped with: a light-scanning unit that scans a light beam generated according to image data from the main control unit 20; a photoreceptor drum on which a latent electrostatic image is formed when irradiated with the light bean scanned by the light-scanning unit; a developing unit that develops by supplying developer, such as toner or the like, onto the latent electrostatic image on the photoreceptor drum; a transfer unit that transfers the image made visible by developing onto recording paper; and a fixing unit that fixes the image that has been transferred onto the recording paper. The processes in the above sequence are referred to below so as "image forming processing" in general. "Image forming processing" will also be referred to below as "printing" where appropriated.

Substantially all the area of the front face of the casing 18 housing the image forming unit 12 is open, as seen in FIG. 3, and a pair of doors 34 are attached thereto in a double-door configuration.

By opening the pair of doors 34, a maintenance operating space is thereby provided of substantially the same surface area as that of the whole face of the casing 18 when maintenance is carried out on the image forming unit 12.

Configuration is made such that the recording paper 50 (for example the form blank 50A shown in FIGS. 2A to 2D) to be fed to the image forming unit 12 is selectively taken out from a tray 36 provided below the openable lid 32 or from plural trays 38 provided in the paper storage unit 14. The plural trays 36, 38 are capable of storing recording paper 50 of different sizes (and sometimes of the same size), and one or other of the trays 36, 38 is selected according to the instruction of the image forming unit 12 based on the instruction from the main control unit 20, and, for example, the recording paper 50 is fed out in sequence from the uppermost sheet thereof.

The top portion of the paper storage unit 14 is a conveying unit 40 for conveying recording paper 50 that has been printed by the image forming unit 12. Namely, when post-processing is required on the recording paper 50 printed by the image forming unit 12, the recording paper 50 is conveyed to the post-processing unit 16 via the conveying unit 40. It should be noted that recording paper 50 not requiring post-processing is discharged to a discharge tray unit 42 disposed below the openable lid 32.

The post-processing unit 16, also referred so as a finishing unit, executes, for example, processes such as book binding, fastening, hole opening, folding etc., and collation processing by job or by a plural number of copies.

Configuration of the Reprinting System

As shown in FIG. 1, when print data is input to the enterprise printing apparatus 100, print processing is executed in the enterprise printing apparatus 100, and the recording paper 50 resulting from printing is output.

When output of the print data to the recording paper 50 (the form blank 50A) is completed, the print data is not held in the enterprise printing apparatus 100 but is destroyed. Therefore, it is necessary to re-acquire the print data in order to view contents that have once been printed, or to carry out reprinting thereof. The present exemplary embodiment is configured such that the print data input to the enterprise printing apparatus 100 is received by the electronic format data management device 10.

Figure 4:
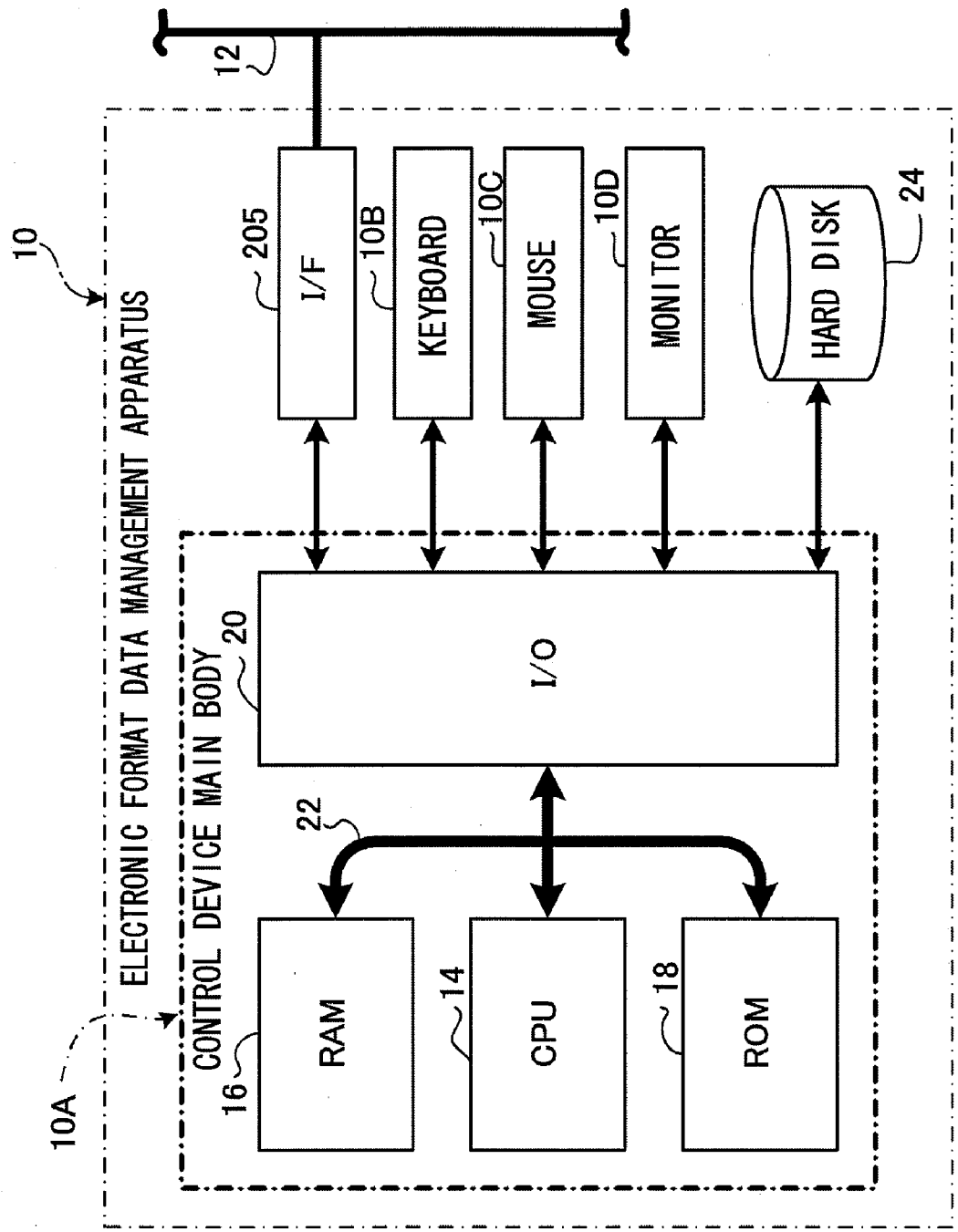
FIG. 4 is a hardware configuration diagram of an electronic format data management device according to the present exemplary embodiment.

FIG. 4 is a hardware configuration diagram of the electronic format data management device 10.

A control device main body 10A includes a CPU 14, a RAM 16, a ROM 18 and an I/O (input-output unit) 20, and, connecting these together, a bus 22 that is a data bus, control bus etc.

A keyboard 10B, a mouse 10C, and a monitor 10D are each respectively connected to the I/O 20. A hard disk drive (HDD) 24 that is a large capacity storage medium, having a storage capacity at least larger than the ROM 18, is connected to the I/O 20, such that job data (PDF data etc. as described later) for plural jobs can be stored therein. The I/O 20 is connected to a communications circuit network 12 via an interface unit (I/F) 26.

The electronic format data management device 10 configured as described above has the role of editing received print data to the print format for the form blank 50A, and storing the edited print data. When performing such editing, the electronic format data management device 10 converts the received print data into, for example, PDF data. The barcode image 56 (see FIG. 2A) is therefore downloaded in a format (for example a barcode font, barcode pattern data etc.) aligned to the enterprise printing apparatus 100.

As well as the monitor 10D for viewing, there is also a printing apparatus 110 (see FIG. 1) connected to the electronic format data management device 10 via the communications circuit network 12, the printing apparatus 110 being for reprinting a portion of the enterprise print run. Reference will be made below to the "reprint device 110", in order to differentiate from the enterprise printing apparatus 100.

An operator views (displays on the monitor) desired data and instructs reprinting as required by searching PDF data held in the electronic format data management device 10.

However, when reprinting, the barcode image 56 (see FIG. 2A) that has become PDF data has a format aligned to printing in the enterprise printing apparatus 100 (barcode font, barcode pattern data, etc. as mentioned above). Therefore there is the possibility of barcode reading problems arising after printing if the format is not suitable for the reprint device 110.

In the present exemplary embodiment, the following actions are performed in the electronic format data management device 10 in order to address this.

(Action 1)

Barcode data, including the start position, region, type and actual encoded data, of the barcode image 56 is embedded in a non-viewing region present in the PDF data. The non-viewing regions of the PDF data indicates "bookmark", "comment", "note", "PDF mark" regions.

(Action 2)

The region of the barcode image 56 in the electronic format downloaded as PDF data is clipped out.

(Action 3)

For the region clipped in Action 2, the type and actual encoded data of the barcode data embedded in the non-viewing region is read out, and barcode image data is regenerated, in a barcode format appropriately aligned to the reprint device 110.

(Action 4)

The barcode image data regenerated in Action 3 is pasted into the PDF data based on the start position and region of the barcode data embedded in the non-viewing region.

Figure 5:
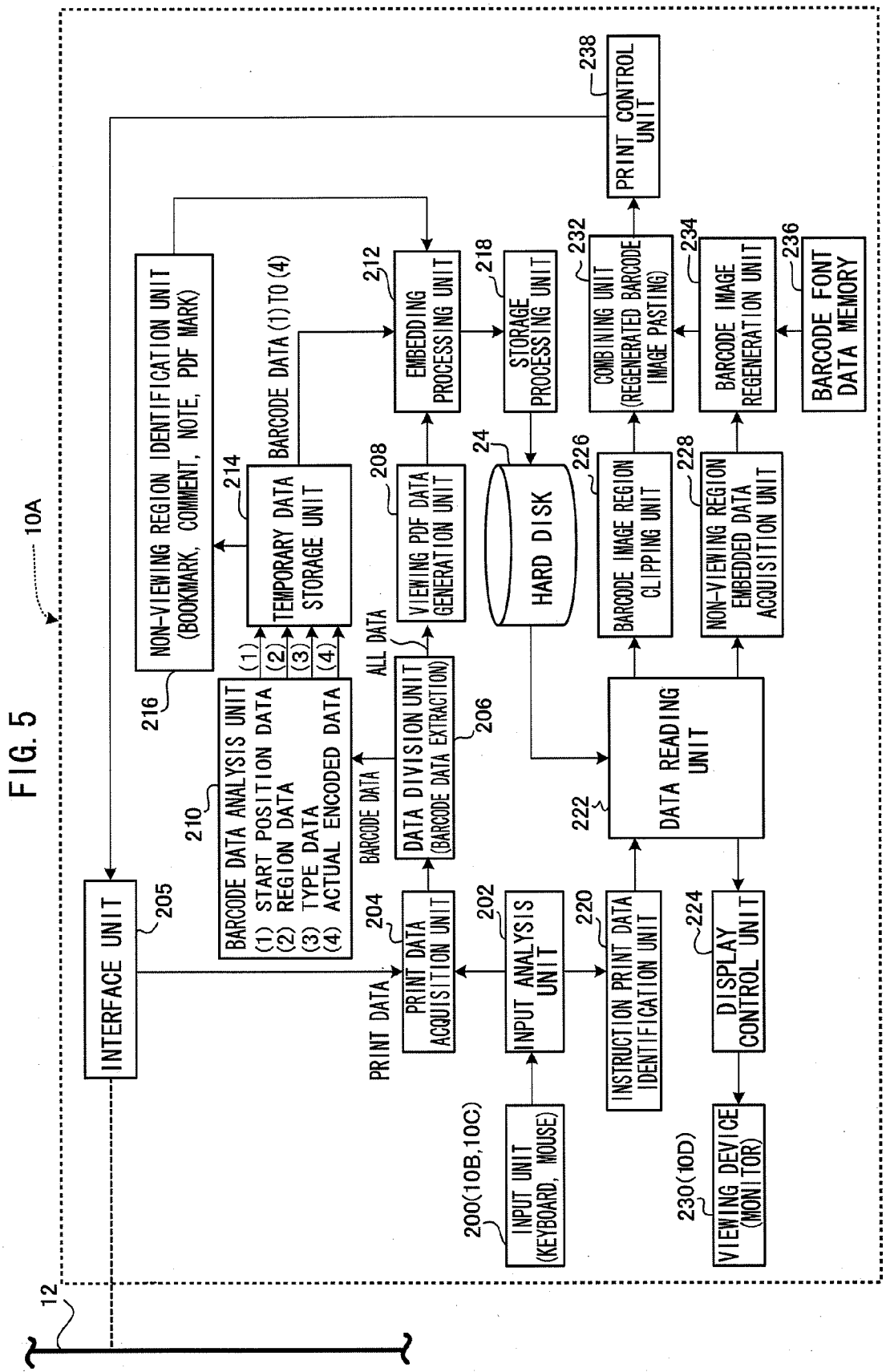
FIG. 5 is a functional block diagram for execution of print data acquisition processing and reprint instruction in an electronic format data management device according to the present exemplary embodiment.

FIG. 5 is a functional block diagram for the execution of the above Action 1 to Action 4 in the enterprise printing apparatus 100. It should be noted that the blocks in FIG. 5 are purely functionally separated, and do not limit the hardware configuration.

As shown in FIG. 5, an input unit (a collective name for the keyboard 10B and mouse 10C above) 200 is connected to an input analysis unit 202.

The input analysis unit 202 analyses the instruction input to the input unit 200, and, in particular, analysis (determines) here whether print data acquisition is instructed, or whether reprinting of stored PDF data is instructed.

Print Data Acquisition Instruction

The input analysis unit 202 is connected to a print data acquisition unit 204. When determination is made, as a result of the analysis of the input analysis unit 202, that the input instruction is a print data acquisition instruction, then the print data acquisition unit 204 is activated.

The print data acquisition unit 204 acquires print data via the interface unit 205. It should be noted that configuration may be made such that such print data acquisition does not depend on the input unit 200, and acquisition is always made when print data is sent to the enterprise printing apparatus 100.

The print data acquisition unit 204 is connected to a data division unit 206. When the print data acquisition unit 204 has acquired print data, the print data is sent to the data division unit 206.

The data division unit 206 has the role of dividing the acquired print data according to each category of data.

For example, FIG. 2A to 2D shows the form blank 50A on which processing by the enterprise printing apparatus 100 is made. This form blank 50A is a "payment transaction form" applicable for making payments of bills etc. at a convenience store or the like, and the form blank 50A has printing related thereto printed in advance on the recording paper 50.

Figure 2C:
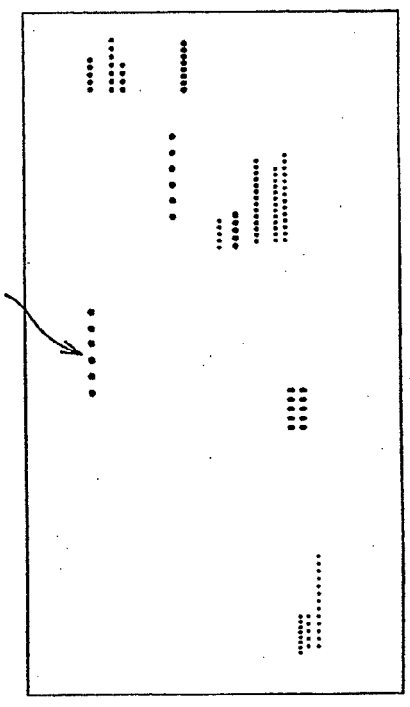

In this case of the form blank 50A, the image data is divided by the data division unit 206, from the original contents shown in FIG. 2A, into image data for an overlay image 58 of FIG. 2B, a text image 54 of FIG. 2C, and a barcode image 56 of FIG. 2D. PDF conversion processing is executed for each of the units of image data divided in this manner.

After the print data has been divided in the data division unit 206, all of the divided image data (the overlay image 58, the text image 54 and the barcode image 56) are sent to the viewing PDF data generation unit 208.

From among all the image data divided by the data division unit 206, barcode data is extracted from the barcode image 56, and sent to the barcode data analysis unit 210.

PDF conversion processing is executed in the viewing PDF data generation unit 208 on the image data that has been divided into each category, and the viewing PDF data is generated. The generated PDF data is sent to an embedding processing unit 212.

The extracted barcode data is analyzed in the barcode data analysis unit 210 and data (1) to (4) below are obtained.
(1) Start position data:
  Data identifying the start location when printing the barcode image 56
(2) Region data:
  Data specifying the print region of the barcode image 56
(3) Type data:
  Data to discriminate the type of barcode (for example I AN-code, J AN-code, etc.)
(4) Actual encoded data:
  The actual encoded data contents of the data represented by the barcode The acquired data (1) to (4) will be referred to collectively below as "barcode data".

The barcode data is sent from the barcode data analysis unit 210 to the temporary data storage unit 214, where it is temporarily stored.

When the barcode data has been input to the temporary data storage unit 214, the non-viewing region identification unit 216 is activated, and the storage location for the barcode data is identified. For example, PDF data generally has embedding regions for bookmarks, comments, notes, PDF marks etc., and one or other of these regions is identified as the storage location where the barcode data is to be stored.

When the storage location of the barcode data has been identified by the non-viewing region identification unit 216, this identification data is sent to the embedding processing unit 212. The temporary data storage unit 214 is synchronized with the activation of the non-viewing region identification unit 216 and sends the barcode data to the embedding processing unit 212.

The embedding processing unit 212 embeds the barcode data in the identified embedding location of the PDF data sent from the viewing PDF data generation unit 208.

The embedding processing unit 212 is connected to a storage processing unit 218. When embedding of the barcode data is completed by the embedding processing unit 212, the PDF data is sent to the storage processing unit 218. The PDF data is stored in the hard disk drive 24 by the storage processing unit 218.

PDF Data Reprint Instruction

In the input analysis unit 202, when a signal from the input unit 200 is confirmed to be an instruction to reprint the PDF data stored in the hard disk drive 24, the input analysis unit 202 specifies an instruction print data identification unit 220 to reprint the PDF data.

The instruction print data identification unit 220 is connected to a data reading unit 222. The data reading unit 222 reads out the PDF data identified in the instruction print data identification unit 220 from the hard disk drive 24.

The data reading unit 222 is connected to a display control unit 224, a barcode image region clipping unit 226, and a non-viewing region embedded data acquisition unit 228, respectively.

The display control unit 224 receives the PDF data read by the data reading section 222, controls a viewing device 230 (the monitor 10D) and displays an image.

The barcode image region clipping unit 226 subjects the barcode image 56 region in the PDF data read by the data reading unit 222 to clipping processing. The print result of the PDF data at this point has the barcode image 56 portion missing, and is an image of a "moth eaten" state.

The barcode image region clipping unit 226 is connected to a combining unit 232, and sends the PDF data to the combining unit 232 in a state in which the barcode image region is clipped out.

The non-viewing region embedded data acquisition unit 228 acquires the barcode data (1) to (4) stored in the non-viewing region of the PDF data (the identified region of the bookmark, comment, note, PDF mark regions). The non-viewing region embedded data acquisition unit 228 is connected to the barcode image regeneration unit 234 and sends the barcode data to a barcode image regeneration unit 234.

The barcode image regeneration unit 234 is connected to a barcode font data memory 236. Barcode fonts applicable when printing with the reprint device 110 (see FIG. 1) are stored in the barcode font data memory 236.

Namely, in the barcode image regeneration unit 234, the barcode image 56 is regenerated based on a barcode font appropriate to printing by the reprint device 110 in order to print the barcode image in the optimum state when reprinting with the reprint device 110.

The barcode image regeneration unit 234 is connected to a combining unit 232.

As a result, in the combining unit 232, the PDF data in the state with the barcode image region, input from the barcode image region clipping unit 226, clipped out, is matched up with the regenerated barcode image data input from the barcode image regeneration unit 234, and combined together.

The combining unit 232 is connected to the print control unit 238, and sends the combined PDF data to the reprint device 110 via the interface unit 205.

Explanation will be given below of the operation of the present exemplary embodiment, with reference to the flow charts of FIG. 6 and FIG. 7.

Figure 6:
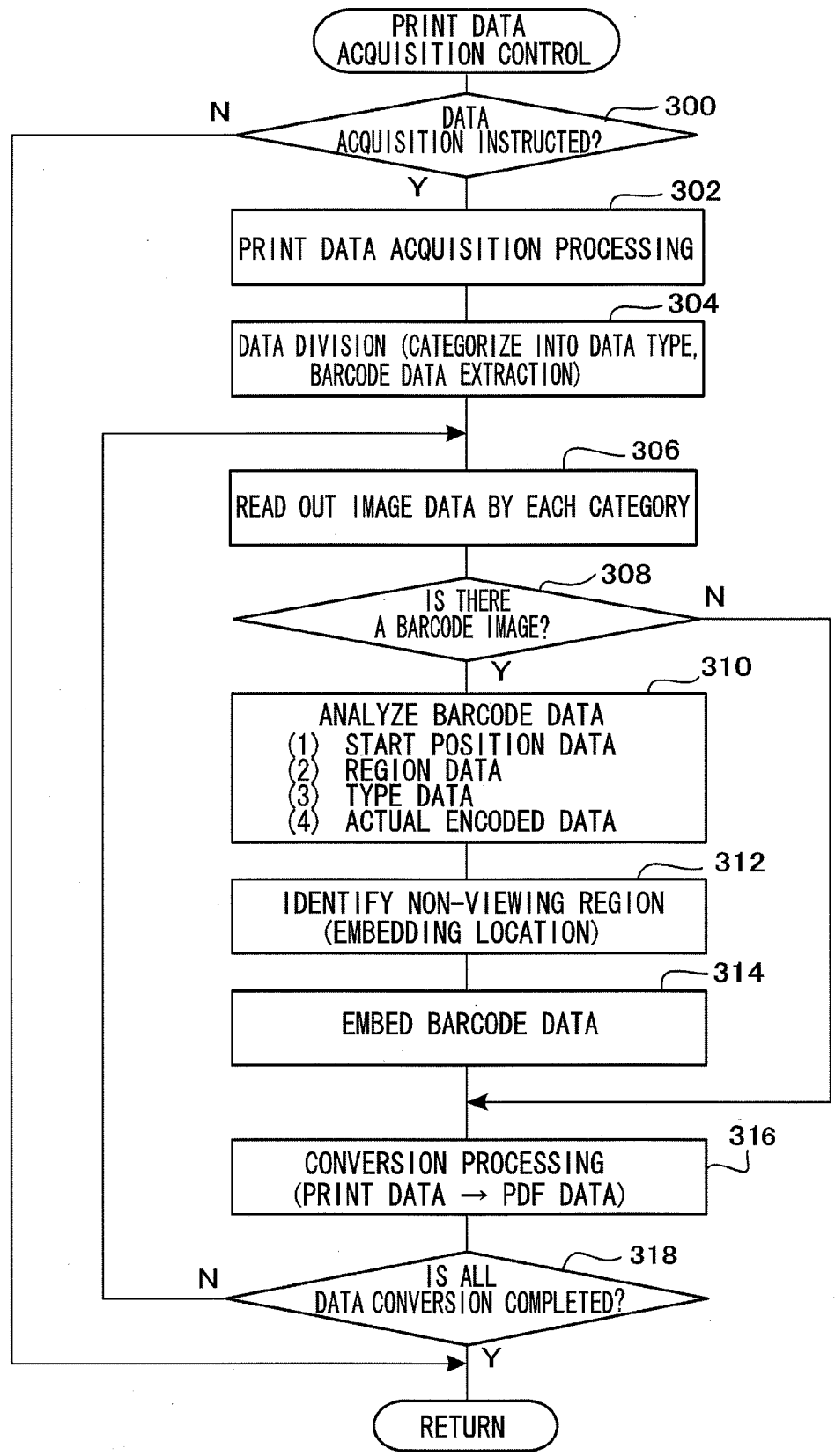
FIG. 6 is a flow chart showing a print data acquisition control routine in an electronic format data management device according to the present exemplary embodiment.

FIG. 6 is a flow chart showing a print data acquisition control routine in the electronic format data management device 10 according to the present exemplary embodiment.

At step 300, determination is made as to whether or not data acquisition has been instructed, and when this determination is negative the routine is ended.

When step 300 is determined in the affirmative, the routine proceeds to step 302, and print data acquisition processing is executed.

In the next step 304, the acquired print data is divided into each data category.

For example, when the enterprise printing apparatus 100 is to process the original print data of the form blank 50A, the original data is shown in FIG. 2A (blank form).

The blank form is sequentially divided into image data of the overlay image 58 (see FIG. 2B), the text image 54 (see FIG. 2C), and the barcode image 56 (see FIG. 2D) respectively. When this is undertaken, the barcode data is extracted from the barcode image 56.

In the next step 306, the image data of the divided categories is read out in a specific sequence and the routine proceeds to step 308. At step 308, determination is made as to whether or not the category of the read image data is the barcode image 56, and when this determination is affirmative the routine proceeds to step 310, the barcode data is analyzed, and the information (1) to (4) is acquired.

At the next step 312, the non-viewing region (embedded location of the barcode data) of the data after conversion (in this case PDF data) is identified, and then the routine proceeds to step 314 and the barcode data is embedded in the identified embedding location (for PDF data this is in one or other of the bookmark, comment, note, PDF mark locations), and the routine proceeds to step 316.

However, when the determination at step 308 is negative, then there is no need to analyze the barcode data and so the routine proceeds to step 316.

At step 316, conversion processing is executed on the print data by each of the categories, and the routine proceeds to step 318.

At step 318, determination is made as to whether or not conversion processing is completed for all data (all of the categories of data), and when determination is negative the routine returns to step 306, and the above steps are repeated until affirmative determination is made.

The routine is ended when determination at step 316 is affirmative.

Figure 7:
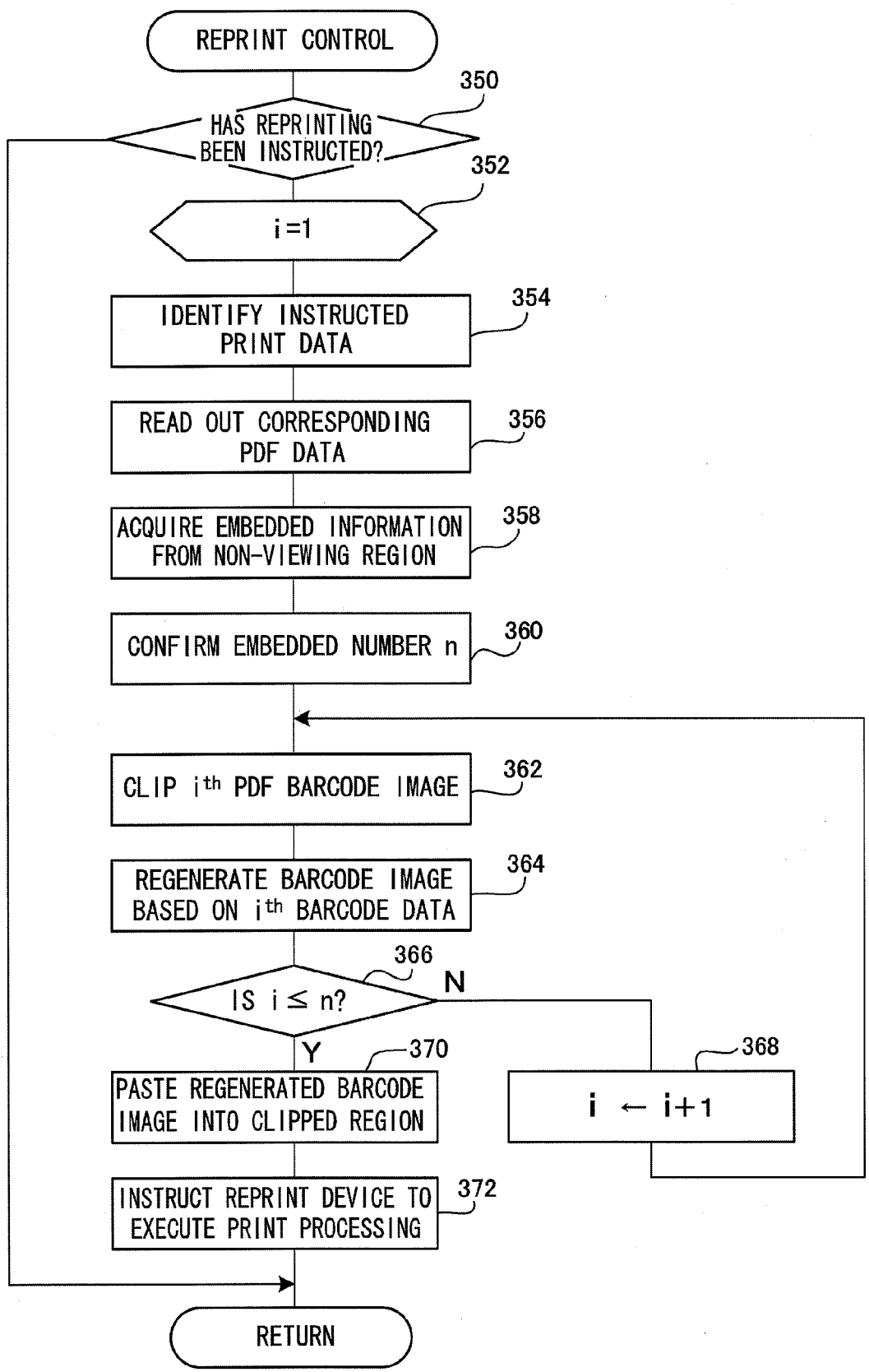
FIG. 7 is a flow chart showing a reprint control routine in an electronic format data management device according to the present exemplary embodiment.

FIG. 7 is a flow chart showing a reprinting control routine in the electronic format data management device 10.

At step 350, determination is made as to whether or not reprinting has been instructed. When this determination at step 350 is negative, the routine is ended. When determination at step 350 is affirmative, the routine proceeds to step 352, the variable i, used for counting the number of items of barcode data embedded in the non-viewing region, is set to 1 and the routine proceeds to step 354.

At step 354, the instructed print data is identified, the routine then proceeds to step 356 where the PDF data corresponding to the identified print data is read from the hard disk drive 24, and the routine proceeds to step 358.

At step 358, the embedded data (namely the barcode data) is acquired from the non-viewing region of the read PDF data.

At the next step 360, the number of items of acquired embedded data n is confirmed, and the routine proceeds to step 362. At step 362, the $i^{th}$ barcode image in the PDF data is clipped out. The PDF data at this point is of a "moth eaten" state, a state with the barcode image portion(s) missing.

At the next step 364, a barcode image is regenerated based on the $i^{th}$ barcode data. When this is done, since regeneration is based on a barcode font applicable to the reprint device 110, there is no reduction due to reprinting in the certainty of barcode reading, by a barcode reader or the like.

In the next step 366, determination is made as to whether or not the variable i (barcode data count) has reached the number of items of acquired embedded data n, and when determination is negative then the routine proceeds to step 368, the variable 1 is incremented (i←i+1) and the routine returns to step 362, and the above steps are repeated.

When the determination at step 366 is affirmative, the routine proceeds to step 370, the regenerated barcode image (s) is/are pasted into the clipped out region(s), the moth eaten state PDF data is returned to a complete data state, and the routine proceeds to step 372. In step 372, instruction is made to execute print processing based on the PDF data in which the barcode image(s) has/have been regenerated, and the routine is ended.

On receipt of the instruction to execute print processing, the reprint device 110 executes print processing based on normal PDF data. When this occurs, for example, variation in the image due to differences in barcode font, spreading etc. are eliminated, and printing is executed with a barcode image aligned with the reprint device 110.

In the present exemplary embodiment configuration is made such that when converting print data into PDF data, the information (barcode data) relating to the barcode image is read out and embedded in a non-viewing region of the PDF data, barcode image(s) in the PDF data are regenerated so as to be aligned with the reprint device 110, the original barcode image(s) is/are clipped out from the PDF data, and the regenerated barcode image(s) are pasted. However, it should be noted that configuration may be made with only one or other of embedding in the non-viewing region of the PDF data, or clipping and pasting the barcode image carried out.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. A barcode data management device comprising:
   a conversion unit that converts print data including barcode data into electronic format data for viewing;
   an extraction unit that extracts barcode data included in the print data, the barcode data including a start position, a range, a type and actual encoded data; and
   an attachment unit that attaches the barcode data extracted by the extraction unit to a region provided in the electronic format data, the region indicating a bookmark, comment or note.

2. A barcode data management device comprising:
   a conversion unit that converts print data including barcode data into electronic format data for viewing;
   an extraction unit that extracts barcode data included in the print data, the barcode data including a start position, a range, a type and actual encoded data from the barcode image rendered into a viewable state;

an attachment unit that attaches the barcode data extracted by the extraction unit to a non-viewing region provided in the electronic format data;

a barcode range identification unit that identifies the start position and the range of the barcode image based on the barcode data attached to the non-viewing region by the attachment unit;

an object exclusion unit that excludes the region of the barcode image identified by the barcode range identification unit from the electronic format information;

a regeneration unit that, based on the electronic format data, regenerates a new printing apparatus-dependent barcode image applicable for print processing on the basis of the actual encoded data in the barcode data attached by the attachment unit to the non-viewing region; and a switching-over unit that switches the barcode image regenerated by the regeneration unit for the barcode image of the region excluded by the object exclusion unit.

3. A printing apparatus comprising:

a print execution unit that converts print data used for a printing activity that occurs within an organization into viewable electronic format data, and based on the electronic format data performs printing in a printing apparatus-dependent state;

an extraction unit that extracts a barcode image included in the electronic format data converted by the conversion unit;

an attachment unit that, based on the barcode image extracted by the extraction unit, attaches barcode data, including a start position, a range, a type and actual encoded data of the barcode image in a viewable state, to a non-viewing region provided in the electronic format data;

a barcode range identification unit that identifies the start position and the range of the barcode image based on the barcode data attached by the attachment unit;

an object exclusion unit that excludes the region of the barcode image identified by the barcode range identification unit from the electronic format information;

a regeneration unit that regenerates a new printing apparatus-dependent barcode image applicable for print processing in the print execution unit on the basis of the actual encoded data of the barcode image stored in the storage unit as a base; and a switching-over unit that switches the barcode image regenerated by the regeneration unit for the barcode image of the region excluded by the object exclusion unit.

4. The barcode data management device of claim 2, wherein the non-viewing region indicates a bookmark, comment, or note.

5. The printing apparatus of claim 3, wherein the non-viewing region indicates a bookmark, comment or note.

* * * * *